United States Patent
Heber et al.

(10) Patent No.: US 12,474,606 B2
(45) Date of Patent: Nov. 18, 2025

(54) DISPLAY SCREEN HAVING A VARIABLE RELATIVE LUMINANCE DISTRIBUTION CURVE

(71) Applicant: siOPTICA GmbH, Jena (DE)

(72) Inventors: André Heber, Weimar (DE); Markus Klippstein, Jena (DE)

(73) Assignee: SIOPTICA GMBH, Jena (DE)

( * ) Notice: Subject to any disclaimer, the term of this patent is extended or adjusted under 35 U.S.C. 154(b) by 0 days.

(21) Appl. No.: 18/835,481

(22) PCT Filed: Oct. 5, 2022

(86) PCT No.: PCT/EP2022/077667
§ 371 (c)(1),
(2) Date: Aug. 2, 2024

(87) PCT Pub. No.: WO2023/147898
PCT Pub. Date: Aug. 10, 2023

(65) Prior Publication Data
US 2025/0116896 A1    Apr. 10, 2025

(30) Foreign Application Priority Data

Feb. 2, 2022  (DE) ...................... 10 2022 102 390.7

(51) Int. Cl.
*G02F 1/13*      (2006.01)
*G02F 1/1335*    (2006.01)

(52) U.S. Cl.
CPC ...... *G02F 1/133507* (2021.01); *G02F 1/1323* (2013.01); *G02F 1/133512* (2013.01); *G02F 1/133528* (2013.01)

(58) Field of Classification Search
CPC ......... G09G 2358/00; G09G 2320/068; G09G 2320/0626; G02F 1/1323
See application file for complete search history.

(56) References Cited

U.S. PATENT DOCUMENTS

| 5,993,940 A | 11/1999 | Ouderkirk et al. |
| 6,765,550 B2 | 7/2004 | Janick et al. |

(Continued)

FOREIGN PATENT DOCUMENTS

| CN | 103576408 A | 2/2014 |
| DE | 10 2019 006 022 B3 | 7/2020 |

(Continued)

*Primary Examiner* — Yuzhen Shen
(74) *Attorney, Agent, or Firm* — Christensen, Fonder, Dardi & Herbert PLLC; John P. Fonder (57) ABSTRACT

A display screen including an image reproduction unit with a control unit and detector for detecting a translation of the image reproduction unit relative to an initial position and/or a rotation of the image reproduction unit relative to an initial orientation and/or for detecting an absolute or relative position of the image reproduction unit with respect to a reference system. The image reproduction unit changes, for a portion of its image surface, the relative luminance distribution curve for contents displayed thereon along a direction R which is selectable but fixedly oriented with respect to the image reproduction unit when a translation path detected by the detector relative to the initial position is above a threshold value and/or a detected angle of rotation relative to the initial orientation is above a respective threshold value and/or the absolute position or relative position with respect to a reference system is outside a tolerance.

15 Claims, 5 Drawing Sheets

(56) References Cited

U.S. PATENT DOCUMENTS

| | | |
|---|---|---|
| 11,726,355 B2 | 8/2023 | Bourgin et al. |
| 11,762,226 B2 | 9/2023 | Jitsui |
| 12,066,699 B2 | 8/2024 | Bregulla et al. |
| 12,321,055 B2 | 6/2025 | Jitsui |
| 2010/0026720 A1* | 2/2010 | Hotta .................... G06F 1/1622 |
| | | 345/652 |
| 2012/0235891 A1 | 9/2012 | Nishitani et al. |
| 2013/0308185 A1 | 11/2013 | Robinson et al. |
| 2014/0036174 A1 | 2/2014 | Oka et al. |
| 2019/0180664 A1* | 6/2019 | Sun ........................ G06F 21/84 |
| 2020/0026114 A1* | 1/2020 | Harrold ............... G02F 1/13475 |
| 2020/0110301 A1* | 4/2020 | Harrold ............. G02F 1/133509 |
| 2020/0333835 A1* | 10/2020 | Wi ........................... G09G 5/38 |
| 2021/0195714 A1* | 6/2021 | Woodgate ................ G09G 3/20 |

FOREIGN PATENT DOCUMENTS

| | | |
|---|---|---|
| DE | 10 2020 002 323 B3 | 7/2021 |
| DE | 10 2020 002 797 B3 | 7/2021 |
| DE | 10 2020 003 265 B3 | 7/2021 |
| DE | 102020006110 B3 | 9/2021 |
| DE | 10 2020 006 442 B3 | 10/2021 |
| DE | 10 2020 007 974 B3 | 10/2021 |
| DE | 10 2020 008 013 B3 | 10/2021 |
| JP | 2007155783 A | 6/2007 |
| WO | 2012033583 A1 | 3/2012 |
| WO | 2015121398 A1 | 8/2015 |

\* cited by examiner

DISPLAY SCREEN HAVING A VARIABLE RELATIVE LUMINANCE DISTRIBUTION CURVE

CROSS-REFERENCE TO RELATED APPLICATION(S)

This application is a Section 371 National Stage Application of International Application No. PCT/EP2022/077667, filed on Oct. 5, 2022, entitled "DISPLAY SCREEN HAVING A VARIABLE RELATIVE LUMINANCE DISTRIBUTION CURVE", which claims priority to German Patent Application No. 10 2022 102 390.7, filed Feb. 2, 2022, the content of which is incorporated herein by reference in its entirety.

FIELD OF THE INVENTION

In recent years, great strides have been made in widening the visual angle in LCDs. However, there are often situations in which this very large viewing area of a display screen can be disadvantageous. Increasingly, information such as bank data or other personal information and sensitive data is also available on mobile devices, such as notebooks and tablets. Accordingly, people need to supervise viewing access to these sensitive data. They should be able to choose between a wide viewing angle-a public mode—for sharing information on their display with others, e.g., when viewing vacation photographs or for advertising purposes. On the other hand, they need a small viewing angle-a private mode-when they want to treat the displayed information confidentially.

A similar problem arises in automotive engineering. In this case, the driver must not be distracted by image contents, e.g., digital entertainment programs, when the engine is operating, but the passenger would like to consume such images also during driving. Consequently, there is a need for a display screen which can switch between the corresponding display modes.

PRIOR ART

Add-on films based on microlouvers have already been used for mobile displays in order to achieve protection of visual data. However, these films were not switchable or toggleable; they always had to be manually applied first and then removed again subsequently. They also had to be carried separately from the display when not in use at a particular time. A further substantial drawback in the use of such louvered films is connected to the light losses entailed.

U.S. Pat. No. 6,765,550 B2 describes such a protected view by means of microlouvers. The greatest disadvantage here is in the mechanical removal or mechanical mounting of the filter and the light losses in protected mode.

U.S. Pat. No. 5,993,940 A describes the use of a film which has small strip-shaped prisms arranged uniformly over its surface in order to achieve a privacy mode, i.e., a limited viewing mode with a small viewing angle area. The development and production are quite cumbersome in terms of technology.

In WO 2012/033583 A1, switching between public view and restricted view is produced through the actuation of liquid crystals between so-called chromonic layers. There is light loss and technical expenditure is quite high.

US 2012/0235891 A1 describes a very elaborate backlight in a display screen. According to FIGS. 1 and 15, not only is a plurality of light guides utilized but also further complex optical elements such as microlens elements 40 and prism structures 50 which reshape the light as it travels from the back illumination to the front illumination. This is expensive and technically complicated to implement and also involves light losses. According to the variant shown in FIG. 17 in US 2012/0235891 A1, both light sources 4R and 18 produce light with a narrow illumination angle, the light from the rear light source 18 first being transformed laboriously into light with a large illumination angle. This complex transformation sharply reduces brightness as already noted above.

According to JP 2007-155783 A, special optical surfaces 19 which are difficult to calculate and produce are used to deflect light in different narrow or broad areas depending on the incident angle of light. These structures resemble Fresnel lenses. Further, there are interference edges which deflect light in unwanted directions. Accordingly, it remains unclear whether or not meaningful light distributions can actually be achieved.

US 2013/0308185 A1 describes a special stepped light guide which emits light on a large area in various directions depending on the direction from which it is illuminated proceeding from a narrow side. Accordingly, in combination with a transmissive imaging display device, e.g., an LC display, a display screen can be produced that is switchable between a public viewing mode and a limited viewing mode. One of the drawbacks here consists in that the limited-view effect can only be produced for left and right or up and down, but not for left and right and up and down simultaneously as is needed for certain payment processes, for example. In addition to this, a residual light is also always still visible in the limited-view mode from blocked viewing angles.

WO 2015/121398 A1 by the present applicant describes a display screen with two modes of operation in which scattering particles are present in the volume of the corresponding light guide for toggling between operating modes. However, the scattering particles selected therein, which comprise a polymerizate, generally have the disadvantage that light is coupled out of both large areas so that about half of the useful light is emitted in the wrong direction, namely, toward the backlight, and cannot be recycled there to a sufficient extent because of the construction. Beyond this, the scattering particles of polymerizate which are distributed in the volume of the light guide can lead under certain circumstances, particularly at high concentrations, to scattering effects which diminish the privacy effect in the protected operating mode.

The methods and arrangements cited above generally share the disadvantage that they do not automatically adapt the protected view characteristics to the requirements of the application.

DESCRIPTION OF THE INVENTION

Therefore, it is the object of the invention to describe a display screen which adapts its light emitting characteristics, particularly preferably its protected view characteristics, during movement, such as rotation and/or translation. This is to be achieved using simple means which are integrated in the display screen and which do not require any actions on the part of the user, such as pressing a toggle button or rotating a mechanical privacy shield.

The above-stated object is met according to the invention by a display screen comprising an image reproduction unit with a control unit and detection means for detecting a translation of the image reproduction unit relative to an initial position and/or a rotation of the image reproduction unit relative to an initial orientation and/or for detecting an absolute position or relative position of the image reproduction unit with respect to a (selectable) reference system. In so doing, the image reproduction unit changes, at least for a portion of its image surface, the relative luminance distribution curve for contents displayed thereon at least along a direction R which is selectable but fixedly oriented with respect to the image reproduction unit if a translation path detected by the aforementioned detection means relative to the initial position is above a selectable threshold value and/or a detected angle of rotation relative to the initial orientation is above a respective selectable threshold value and/or the absolute position or relative position with respect to a reference system is outside a selectable tolerance.

The direction R which is selectable but fixedly oriented with respect to the image reproduction unit can be, for example, the vertical direction with respect to the active image area of the image reproduction unit but is preferably the corresponding horizontal direction when the active image area of the image reproduction unit is viewed in landscape mode. Alternatively, the direction R which is fixedly oriented with respect to the image reproduction unit can be defined as the parallel to a long side (or short side) of the active image area of the image reproduction unit. It is explicitly noted that other configurations, also at an angle between exclusively 0° and exclusively 90° with respect to the aforementioned long side, are possible.

In principle, instead of the above-referenced direction R, directions extending parallel thereto can also be applied where meaningful. This applies to all configurations of the invention.

Relative luminance distribution curve (measured) along direction R refers in particular to the shape of the luminance distribution curve when its maximum value is normalized to unity. As soon the shape changes in such a normalized luminance distribution curve, it means that the viewing angle dependency of the luminance measured along direction R is changed at the corresponding location in the active image area of the image reproduction unit. It further signifies that a changed brightness is emitted even at constant peak brightness in the direction of the peak brightness in at least one angle or angular region, since the relative luminance distribution curve changes. In other words, a change in the relative luminance distribution curve means, explicitly not exclusively, that an image displayed on the image reproduction unit darkens or brightens because the normalized luminance distribution curve measured along the selected direction R would then always remain constant and only the brightness varies.

The image reproduction unit preferably changes, for the entirety of its image surface, the relative luminance distribution curve for contents displayed thereon at least along direction R, which is selectable but fixedly oriented with respect to the image reproduction unit, if a translation path detected by the aforementioned detection means relative to the initial position is above a selectable threshold value and/or a detected angle of rotation relative to the initial orientation is above a respective selectable threshold value and/or the absolute position or relative position with respect to the reference system is outside a selectable tolerance.

A translation path detected by the aforementioned detection means relative to the initial position of the image reproduction unit is above a selectable threshold value, for example, when the corresponding threshold value selected is 2 cm and the detected translation path of the image reproduction unit is approximately 5 cm.

An angle of rotation detected by the aforementioned detection means relative to the initial orientation of the image reproduction unit is above a selectable threshold value, for example, when the threshold value selected is 46° and that of the detected angle of rotation of the image reproduction unit is approximately 80° to 90°.

Only one of the aforementioned threshold values need be considered for the effect of the invention, either that of the translation path or that of the angle of rotation. However, it is also possible to logically AND the two threshold values in order to initiate the change in the relative luminance distribution curve.

Further, as described above, the change in the relative luminance distribution curve can be initiated in that the absolute position or relative position of the image reproduction unit relative to the aforementioned (selectable) reference system is not within the selectable tolerance. If the center of mass of the earth, for example, is selected as reference system, the relative position of the image reproduction unit with respect to it can be described, for example, by a tilt angle relative to the connecting line between the center of mass of the image reproduction unit and the center of mass of the earth determined, e.g., by tilt sensors. For example, when the selectable tolerance of +/−45° (or +/−) 55° is given for this angle, a tilting of the image reproduction unit with a resulting angle having an absolute value of greater than 45° (or 55°) would lead to a change of the relative luminance distribution curve.

On the other hand, it is also possible to select an absolute position of the image reproduction unit relative to the aforementioned (selectable) reference system. For example, the reference system could be a particular office or a house. Information as to whether or not the image reproduction unit is located inside of this house or office would then be particularly important as tolerance for the position. Should this tolerance be exceeded, for example, if the image reproduction unit is located outside of the house or office based, for example, on a GPS signal or cell phone tracking signal, the relative luminance distribution curve changes. If the image reproduction unit is moved back into the house or office again, the relative luminance distribution curve changes again, but now preferably back to the original state. A configuration variant of this kind allows, for example, confidential data outside of a locality determined by means of the selectable tolerance to always be indicated by a narrow relative luminance distribution curve corresponding to a private view mode in which the image contents can be viewed only in a limited viewing angle range because of the narrow relative luminance distribution curve. A wide relative luminance distribution curve corresponding to a public view mode which allows displaying from different viewing angles and, on the whole, a larger viewing angle range compared to the private view mode is also possible within the locality. Naturally, a user could also optionally arrange for a private view mode, i.e., a narrow relative luminance distribution curve, to be applied within the aforementioned locality.

In case of a detected rotation or translation which triggers the change in the relative luminance distribution curve, the display of the image contents displayed on the image reproduction unit advantageously also changes, for example, rotates along with it, moves along with it and/or possibly is even changed or faded out. For example, as is conventional in smart phones, the image contents can be rotated by 90° when the smart phone rotates by more than 45° or 55° in one direction. However, according to the invention, the relative luminance distribution curve along at least one direction is also now changed, possibly also co-rotated.

The image reproduction unit can be, for example, an LCD panel, an OLED, a field emission display (SED), a field emission display (FED), a micro-LED display or a vacuum fluorescence display (VFD). Any other emissive, transmissive, reflective and transflective or other display types are also contemplated.

In a first configuration of the display screen, the relative luminance distribution curve is narrow along a first direction R and is wide along a second direction differing from the first direction R, and, after the aforementioned detection with a detected translation path and/or a detected angle of rotation above the respective selectable threshold value and/or an absolute position or relative position with respect to the reference system within the selectable tolerance, the relative luminance distribution curve is wide along the first direction R and is narrow in the second direction, or vice versa. By "vice versa" is meant here that initially the relative luminance distribution curve is wide along a first direction R and is narrow along the second direction and, after the aforementioned detection, the relative luminance distribution curve is narrow along a first direction R and wide along the second direction.

In this case and also for all further configurations, the preferred mode is when the first direction R is selected parallel to a long side of the image reproduction unit. The second direction is then selected parallel to a short side of the image reproduction unit so that the two directions are perpendicular to one another.

Here and in the following remarks, a relative luminance distribution curve is considered narrow when, in angles which deviate by more than +/−45° around a (definable) reference angle, measured along a defined direction, particularly direction R, emission is always less than 4%, preferably less than 2%, of the peak brightness. For example, if the reference angle is 0 degrees and direction R extends horizontal to the image reproduction unit, the condition for a narrow relative luminance distribution curve would be met when at most 1.5% of the peak brightness is emitted in the angular ranges of from −90° to −45° and from +45° to +90°. The peak brightness can be, for example, 0° or also +/−5° or +/−10° or somewhere within this range.

In contrast, a relative luminance distribution curve is considered wide when, in angles which deviate by +/−45° around a (definable) reference angle, measured along a defined direction, particularly direction R, more than 4%, preferably more than 6% of the peak brightness is emitted. For example, if the reference angle is 0° and direction R extends horizontal to the image reproduction unit, the condition for a wide relative luminance distribution curve would be met if more than 6% of the peak brightness were emitted in angles −45° and +45°, respectively. The peak brightness can be 0° or also +/−5° or +/−10° in this case, for example. To avoid misunderstandings, it is noted that the definition for a wide relative luminance distribution curve does not explicitly require that even more than 4% of the peak brightness is demanded in angles which deviate by more than +/−45° from the reference angle.

The above-described first configuration is especially relevant in practical respects: if the display screen is the display screen of a mobile device, for example, particularly a smart phone or tablet PC, the narrow relative luminance distribution curve along the aforementioned direction R causes a protected view preventing viewing from the side. If the device is rotated by 90° and the threshold value for the rotation, which can be 50°, for example, is exceeded, the protected view existing for the viewer persists after the detected rotation. In other words, prior to the detection of a (first) rotation, there is a protected view (narrow luminance distribution) in horizontal direction R. Subsequent to the detected rotation, there is a protected view (narrow luminance distribution) in the vertical, second direction perpendicular to horizontal direction R which is coupled with the image reproduction unit so as to be fixed to the body. A back rotation and, consequently, a further detection, can rotate the protected view, therefore the narrow relative luminance distribution, back again by 90°, and so on.

In a second configuration of the display screen, the relative luminance distribution curve is narrow, in accordance with the above definitions, along a first direction R and wide along a second direction differing from the first direction R. After the aforementioned detection with a detected translation path and/or a detected angle of rotation above the respective selectable threshold value and/or an absolute position or relative position with respect to the reference system within the selectable tolerance, the relative luminance distribution curve is wide in both directions, or vice versa. By "vice versa" is meant here that initially the relative luminance distribution curve is wide along a first direction and wide along the second direction and, after the aforementioned detection, the relative luminance distribution curve is narrow along the first direction and wide along the second direction.

In a third configuration of the display screen, the relative luminance distribution curve is narrow, in accordance with the above definitions, along a first direction R and along a second direction differing from the first direction R, and after the aforementioned detection with a detected translation path and/or a detected angle of rotation above the respective selectable threshold value and/or an absolute position or relative position with respect to the reference system within the selectable tolerance, the relative luminance distribution curve is wide along the first direction R and along the second direction, or vice versa. By "vice versa" is meant here that initially the relative luminance distribution curve is wide along the first direction and along the second direction and, after the aforementioned detection, the relative luminance distribution curve is narrow along the first direction R and along the second direction.

In a fourth configuration of the display screen, the relative luminance distribution curve is wide, in accordance with the above definitions, along a first direction R and narrow along a second direction differing from the first direction R and, after the aforementioned detection with a detected translation path and/or a detected angle of rotation above the respective selectable threshold value and/or an absolute position or relative position with respect to the reference system within the selectable tolerance, the relative luminance distribution curve is narrow along the first direction R and along the second direction, or vice versa. By "vice versa" is meant here that initially the relative luminance distribution curve is narrow along the first direction and along the second direction and, after the aforementioned detection, the relative luminance distribution curve is wide along the first direction R and narrow along the second direction.

Finally, in a fifth configuration of the display screen, the relative luminance distribution curve is narrow, in accordance with the above definitions, along at least one direction and, after the aforementioned detection with a detected translation path and/or a detected angle of rotation above the respective selectable threshold value and/or an absolute position or relative position with respect to the reference system within the selectable tolerance, the relative luminance distribution curve is narrower along the at least one direction than it was prior to the aforementioned detection, or vice versa. By "vice versa" is meant here that initially the relative luminance distribution curve is very narrow along at least one direction and, after the aforementioned detection, the relative luminance distribution curve is still narrow along the at least one direction but is nevertheless wider than prior to the detection. The full width at half maximum (FWHM), for example, can serve here as criterion for distinguishing between "narrow" and "very narrow". A narrow relative luminance distribution has a greater FWHM than a very narrow relative luminance distribution. However, both relative luminance distributions must of course fulfill the definition introduced above for a narrow relative luminance distribution.

This configuration is helpful, for example, when the viewing distance of a viewer changes in a private view mode of the display screen along the at least one direction, e.g., the horizontal direction. At a shorter viewing distance from the display screen, the relative luminance distribution curve should be wider than at a greater distance so as to allow the best possible image perception. Conversely, at a greater viewing distance from the display screen, the relative luminance distribution curve should be narrower than at a closer distance.

Said means for detecting a translation and/or a rotation of the image reproduction unit comprises, for example, at least one of the following components: a sensor with which translational and/or rotational movements can be directly detected, for example, a gravitational sensor, magnetometer, accelerometer, tachometer, radio sensor, laser, rotational sensor, force sensor, pressure sensor, and/or also sensors which can detect a translational and/or rotational movement indirectly with respect to an external coordinate system, e.g., GPS sensor, radar, satellite positioning, WLAN, cell tracking, ultrasound unit, eye tracking, camera, 3D camera, infrared camera, time-of-flight camera, or LIDAR. However, other configurations are also possible.

Figure 6:
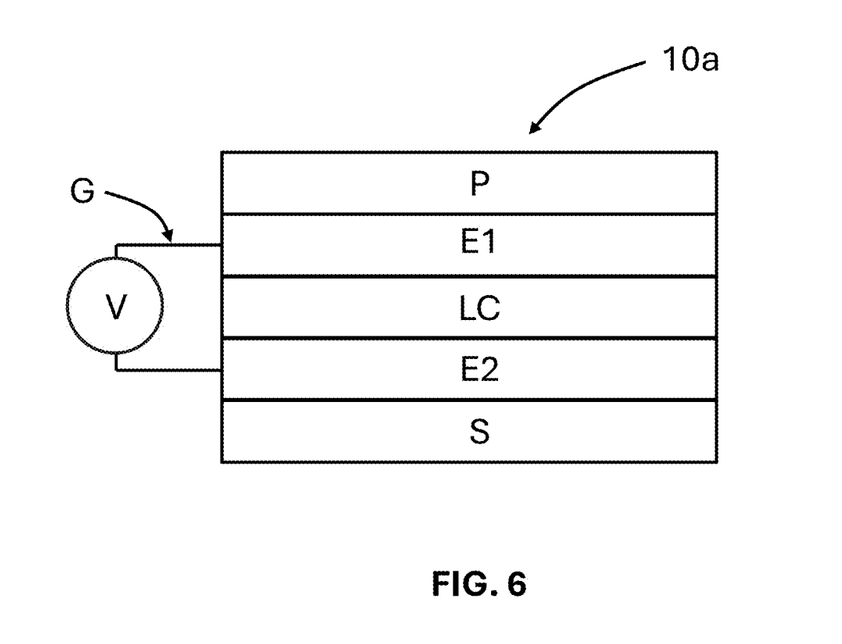
FIG. 6 the schematic diagram depicting a switchable light filter, according to an embodiment of the present disclosure.

A display screen of the above-described first configuration can comprise, for example, a switchable light filter located in front in viewing direction of a viewer or in the image reproduction unit. Embodiments of switchable light filters are depicted in FIGS. 6-9, may include one or more of optical elements S, polarization filters P, liquid crystal layers LC and generator G with voltage source V and electrodes E1 and E2, configured to selectively generate first and second electric fields. Switchable light filter 10a of the first configuration, as depicted in FIG. 6, in turn comprises: a first optical element S comprising a first layer, or a first layer and a plurality of further layers, each layer comprising a material with a plurality of light-absorbing transition dipole moments, the majority of the transition dipole moments, preferably more than 85%, particularly preferably more than 95%, particularly every transition dipole moment, being oriented, at least in a first state with a tolerance of a maximum of 10°, parallel to a first reference direction which is selectable for the first optical element S or fluctuating around the first reference direction, such that light which is incident in the first optical element S is transmitted or at least partially absorbed depending on its incident direction relative to the layers and its polarization state. The display screen further comprises a polarization filter P which is arranged upstream or downstream of the first optical element S considered in incident direction, generator G that includes voltage source V and first and second electrodes E1 and E2, respectively, configured to selectively generate a first electric field or a second electric field, a liquid crystal layer LC arranged between the first optical element S and the polarization filter P, this liquid crystal layer LC being acted upon by the first electric field or the second electric field and, depending thereon, influences the polarization state of light passing through it so that, in a first operating mode B1 in which the first electric field is applied, with a first sub-operating mode B1H and a second sub-operating mode B1V, on the one hand, at least 24% of unpolarized light which is incident in the switchable light filter 10a parallel to the first reference direction is transmitted and, on the other hand, at least 85% of unpolarized light which is incident in the switchable light filter 10a in an angle of greater than 30° to the first reference direction is absorbed. This absorption takes place exclusively in a first reference direction in the first sub-operating mode B1H and exclusively in a second direction perpendicular to the first reference direction in the second sub-operating mode B1V. In a second operating mode B2 in which the second electric field is applied, with the first sub-operating mode B1H and the second sub-operating mode B1V, on the one hand, at least 24% of unpolarized light which is incident in the switchable light filter 10a parallel to the first reference direction is transmitted and, on the other hand, at least 85% of unpolarized light which is incident in the switchable light filter 10a in an angle of greater than 30° with respect to the first reference direction is absorbed, this absorption taking place exclusively in the second reference direction in the first sub-operating mode B1H and exclusively in the second reference direction perpendicular to the first reference direction in the second sub-operating mode B1V, so that the reference directions of absorption differ by 90°, respectively, for each of the two sub-operating modes B1H, B1V for the first operating mode B1 and the second operating mode B2.

Further details relating to the functioning and configuration of an aforementioned switchable light filter 10a are contained in the DE 10 2020 006 110 B3 patent family by the present applicant, which serves here as reference and the disclosure of which is incorporated herein in its entirety.

The reference directions referred to above need not coincide with direction R. However, it is advantageous when the first reference direction extends approximately perpendicular to direction R when projected on one another.

Figure 7:
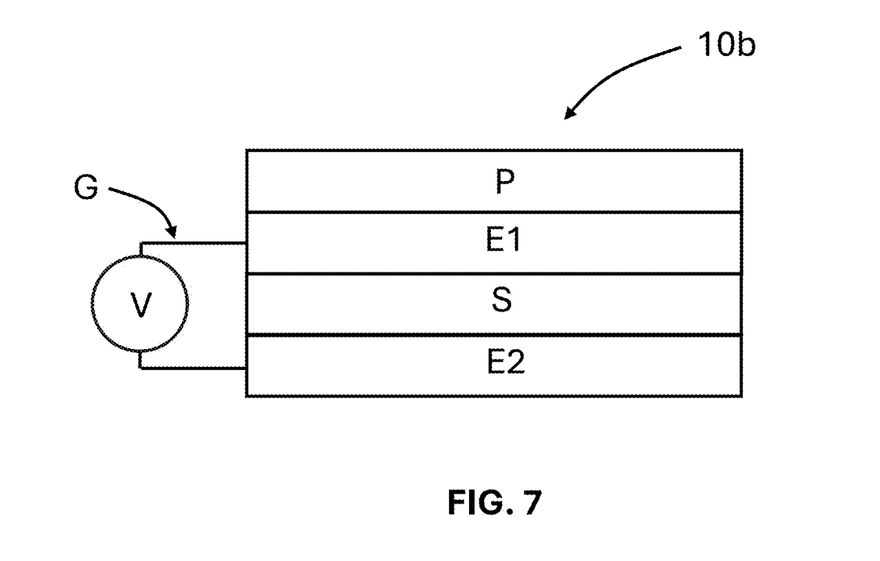
FIG. 7 the schematic diagram depicting a switchable light filter, according to another embodiment of the present disclosure.

A display screen of the above-described first configuration can comprise, for example, the switchable light filter 10b as depicted in FIG. 7, located in front in viewing direction of a viewer or in the image reproduction unit. The switchable light filter 10b in turn comprises: a first optical element S comprising a first layer, or a first layer and a plurality of further layers, each layer comprising a material with a plurality of light-absorbing transition dipole moments, the majority of the transition dipole moments, preferably more than 85%, particularly preferably more than 95%, particularly every transition dipole moment, being oriented, at least in a first state with a tolerance of a maximum of 10°, parallel to a first reference direction which is selectable for the first optical element S or fluctuating around the first reference direction, such that light which is incident in the first optical element S is transmitted or at least partially absorbed depending on its incident direction relative to the layers and its polarization state, and the transition dipole moments in each of the layers can be varied with respect to orientation and/or amount between the first state and at least one second state in order, alternately, to bring the respective layer into at least two different states. The display screen of this second configuration further comprises a polarization filter P which is arranged upstream or downstream of the first optical element S, generator G having voltage source V and first and second electrodes E1 and E2, respectively, configured to selectively generate a first electric field or a second electric field, wherein, for the first optical element S, the first state is generated by applying the first electric field and the second state is generated by applying the second electric field so that, in a first operating mode B1 in which the first electric field is applied and the transition dipole moments of the layers of the first optical element S are oriented along the first reference direction, with a first sub-operating mode B1H and a second sub-operating mode B1V, on the one hand, at least 24% of unpolarized light which is incident in the switchable light filter 10b parallel to the first reference direction is transmitted and, on the other hand, at least 85% of unpolarized light which is incident in the switchable light filter 10b in an angle of greater than 30° with respect to the first reference direction is absorbed, this absorption taking place exclusively along a first reference direction in the first sub-operating mode B1H and exclusively in a second reference direction perpendicular to the first reference direction in the second sub-operating mode B1V, and in a second operating mode B3 in which the second electric field is applied and the transition dipole moments of the layers of the first optical element S are oriented parallel to a surface of the polarization filter P and perpendicular to a transmission direction of the polarization filter P, at least 24% of unpolarized light which is incident in the switchable light filter 10b at any angle with respect to the first reference direction is transmitted.

Further details relating to the functioning and configuration of a switchable light filter are also contained in the DE 10 2020 006 110 B3 patent family by the present applicant.

Figure 8:
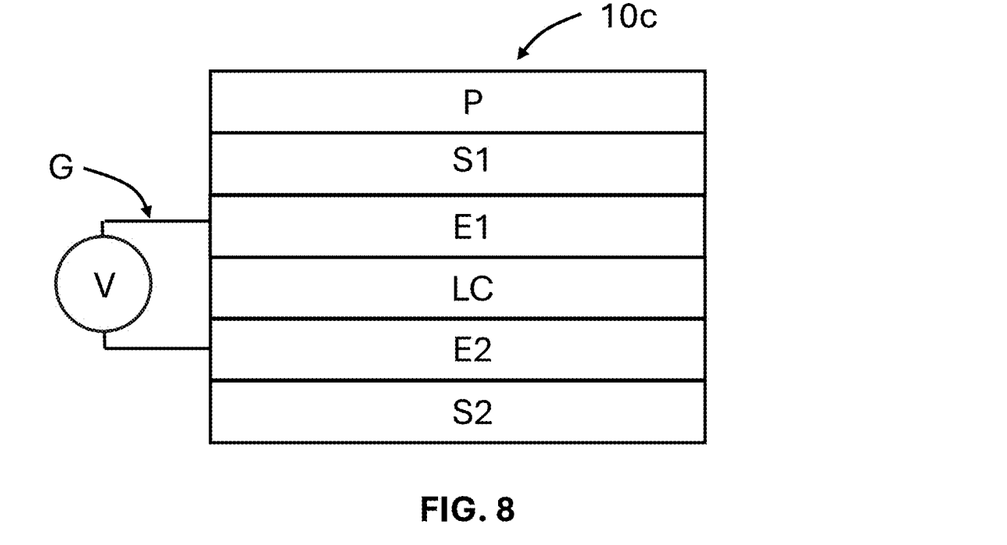
FIG. 8 the schematic diagram depicting a switchable light filter, according to yet another embodiment of the present disclosure.

A display screen of the above-described third or fourth configuration can comprise, for example, a switchable light filter 10c as depicted in FIG. 8 located in front in viewing direction of a viewer or in the image reproduction unit. The switchable light filter 10c in turn comprises: a first optical element S1 and a second optical element S2, each of the two optical elements comprising a first layer, or a first layer and a plurality of further layers, each layer comprising a material with a plurality of light-absorbing transition dipole moments, the majority of the transition dipole moments, preferably more than 85%, particularly preferably more than 95%, particularly every transition dipole moment, being oriented, at least in a first state with a tolerance of a maximum of 10°, parallel to a first reference direction which is selectable for the first optical element S1 and a second reference direction which is selectable for the second optical element S2 or fluctuates around the latter, such that light which is incident in the first optical element S1 or second optical element S2 is transmitted or at least partially absorbed depending on its incident direction relative to the layers and its polarization state, wherein the first reference direction and the second reference direction of the transition dipole moments differ from one another by less than 40°. The display screen of the third or fourth configuration further comprises a liquid crystal layer LC which is arranged between the first optical element S1 and the second optical element S2 and which, depending on a first electric field or second electric field acting upon the liquid crystal layer LC, influences the polarization state of light penetrating through it, generator G that includes voltage source V and first and second electrodes E1 and E2, respectively, configured to selectively generate the first electric field or the second electric field, optionally, a polarization filter P which is arranged above or below a unit comprising one of the two optical elements S1, S2, or no polarization filter P, so that (i) either, if the polarization filter P is present, in a first operating mode B1 in which the first electric field is applied, with a first sub-operating mode B1H and a second sub-operating mode B1V, on the one hand, at least 24% of unpolarized light which is incident in the switchable light filter 10c parallel to the first reference direction or second reference direction is transmitted and, on the other hand, at least 85% of unpolarized light which is incident in the switchable light filter 10c in an angle of greater than 30° with respect to the corresponding reference direction is absorbed, this absorption taking place exclusively along a first reference direction in the first sub-operating mode B1H and exclusively in a second reference direction perpendicular to the first reference direction in the second sub-operating mode B1V, either the first reference direction or the second reference direction being perpendicular to a polarization direction of the polarization filter P, (ii) or, if no polarization filter P is present, in a first operating mode B1 in which the first electric field is applied, at least 24% of unpolarized light which is incident in the switchable light filter 10c at any angle is transmitted, (iii) and, regardless of the presence of a polarization filter P, in a second operating mode B2 in which the second electric field is applied, on the one hand, at least 24% of unpolarized light which is incident in the switchable light filter 10c parallel to the first reference direction or to the second reference direction is transmitted and, on the other hand, at least 85% of unpolarized light which is incident in the switchable light filter 10c in an angle of greater than 30° with respect to the corresponding reference direction is absorbed.

Again, further details relating to the functioning and configuration of a switchable light filter 10c are also contained in the DE 10 2020 006 110 B3 patent family by the present applicant.

Figure 9:
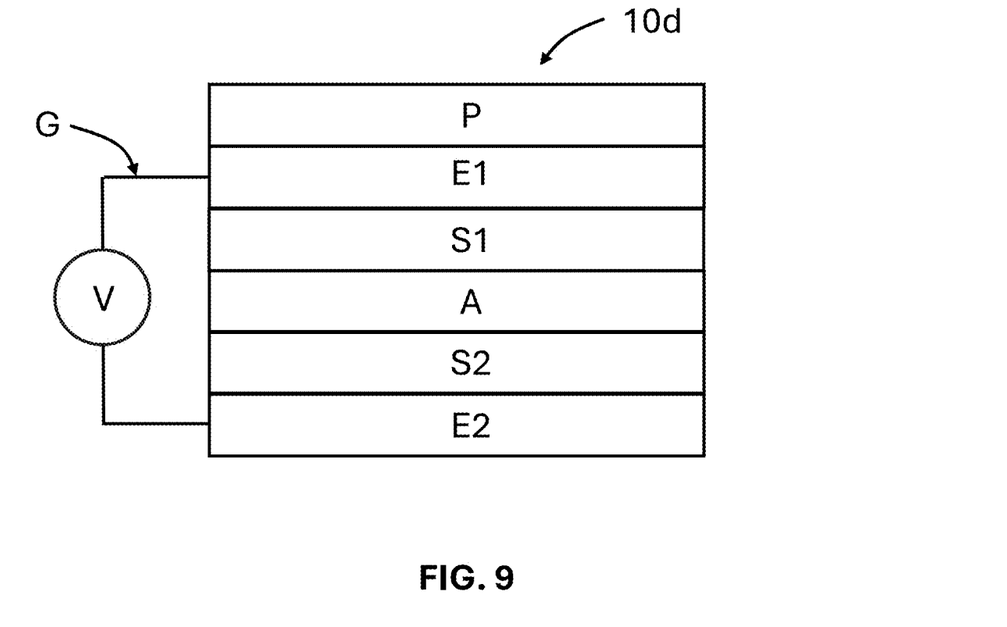
FIG. 9 the schematic diagram depicting a switchable light filter, according to another embodiment of the present disclosure.

Lastly, a display screen according to the fifth configuration can comprise, for example, a switchable light filter 10d as depicted in FIG. 9 located in front in viewing direction of a viewer or in the image reproduction unit. The switchable light filter 10d in turn comprises: a first optical element S1 and a second optical element S2, each of the two optical elements comprising a first layer, or a first layer and a plurality of further layers, each layer comprising a material with a plurality of light-absorbing transition dipole moments, the majority of the transition dipole moments, preferably more than 85%, particularly preferably more than 95%, particularly every transition dipole moment, being oriented, at least in a first state with a tolerance of a maximum of 10°, parallel to a first reference direction which is selectable for the first optical element S1 and a second reference direction which is selectable for the second optical element S2 or fluctuates around the latter, such that light which is incident in the first optical element S1 or second optical element S2 is transmitted or at least partially absorbed depending on its incident direction relative to the layers and its polarization state, and the transition dipole moments in each of the layers can be varied with respect to orientation and/or amount between the first state and at least one second state in order, alternately, to bring the respective layer into at least two different states. The display screen according to the fifth configuration then further comprises generator G that includes voltage source V and first and second electrodes E1 and E2, respectively, configured to selectively generate a first electric field or a second electric field, and, for each of the two optical elements S1, S2, the first state is generated by applying the first electric field and the second state is generated by applying the second electric field, an optically anisotropic layer A arranged between the two optical elements for rotating a polarization direction of light which penetrates the optically anisotropic layer A by 90° and, optionally, a polarization filter P arranged above or below a unit comprising one of the two optical elements, or no polarization filter P, so that, in a first operating mode B1 in which the first electric field is applied, at least 24% of unpolarized light which is incident in the switchable light filter 10$d$ at any angle is transmitted, and in the first operating mode B1, the transition dipole moments of the two optical elements are oriented perpendicular to one another and, in case no polarization filter P is present, polarization filter transition dipole elements of the polarization filter P are oriented parallel to the transition dipole moments of the switchable optical element closest to the polarization filter, and in a second operating mode B2 in which the second electric field is applied, on the one hand, at least 24% of unpolarized light which is incident in the switchable light filter parallel to the first reference direction or to the second reference direction is transmitted and, on the other hand, at least 85% of unpolarized light which is incident in the switchable light filter in an angle of greater than 30° to the corresponding reference direction is absorbed, and in operating mode B2 the transition dipole moments of the polarization filter P, if any, and the transition dipole moments of the switchable optical element closest to the polarization filter are oriented perpendicular to one another, and the transition dipole moments of the two optical elements are oriented parallel to one another.

Lastly, further details relating to the functioning and configuration of a switchable light filter are also contained in the DE 10 2020 006 110 B3 patent family by the present applicant.

In the above described embodiment examples with light filters, these light filters can be divided into a plurality of separately switchable segments so as to allow local switchability between the respective possible operating states, i.e., the relative luminance distribution curves are changed locally only corresponding to selected segments of the image area of the image reproduction unit.

Alternatively, a display screen according to the invention in which the image reproduction unit is realized by means of a transmissive imager such as an LCD panel can have a backlight which can emit light with at least two different selectable relative luminance distribution curves, and the at least two relative luminance distribution curves are measured along direction R which is selectable but fixedly oriented with respect to the image reproduction unit.

A backlight of this kind can be configured, for example, as a dual backlight unit, i.e., it has two light guides with different emission characteristics and, therefore, also with different relative luminance distribution curves measured along the aforementioned direction R. Depending on the desired relative luminance distribution curve, light is then radiated into the one and/or other light guide for coupling out two-dimensionally. The front light guide considered in viewing direction must be at least partially transparent. This implementation variant is helpful, for example, for implementing the fifth configuration of the display screen described above.

Alternatively, it is also possible that a display screen according to the invention has a switchable optical component which can selectively influence the relative luminance distribution curve measured along a direction R which is selectable but fixedly oriented with respect to the image reproduction unit 1. This switchable optical component comprises at least one of the following components: liquid crystals, electrochromic layers, photochromic layers, thermochromic layers, electrophoretic or magnetophoretic particles and/or electrowetting droplets. Examples of such switchable optical components are described, inter alia, in DE 10 2020 006 442 B3, DE 10 2020 008 013 B3, DE 10 2020 007 974 B3, DE 10 2020 003 265 B3, DE 10 2020 002 797 B3, DE 10 2020 002 323 B3 and DE 10 2019 006 022 B3 by the present applicant.

A display screen such as that described above is advantageously used in a mobile device. However, it may also be used in a motor vehicle, aircraft or watercraft, in a pay terminal or in other locations.

In principle, varying the parameters described above within certain limits will not compromise the performance capability.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following by embodiment examples with reference to the accompanying drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

The drawings are not to scale and are merely schematic depictions.

Figure 1:
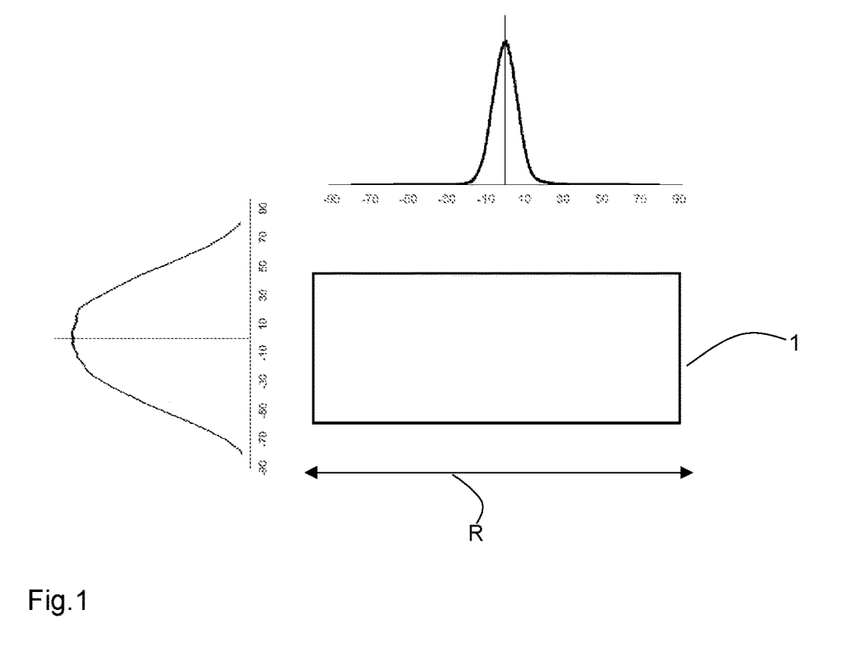
FIG. 1 the schematic diagram of an image reproduction unit in a first state and normalized graphs for relative luminance distribution curves along two directions.

FIG. 1 shows the schematic diagram of an image reproduction unit in a first state and normalized graphs for relative luminance distribution curves along two directions.

An exemplary display screen according to the invention comprises an image reproduction unit 1 (see FIG. 1) with a control unit (not shown), and detection means (not shown) for detecting a translation of the image reproduction unit 1 relative to an initial position and/or a rotation of the image reproduction unit 1 relative to an initial orientation and/or for detecting an absolute position or relative position of the image reproduction unit 1 with respect to a (selectable) reference system. The image reproduction unit 1 changes, at least for a part of its image surface, the relative luminance distribution curve for contents displayed thereon at least along a direction R, which is selectable but fixedly oriented with respect to the image reproduction unit 1, if a translation path detected by said detection means relative to the initial position is above a selectable threshold value and/or a detected angle of rotation relative to the initial orientation is above a respective selectable threshold value and/or the absolute position or relative position with respect to the reference system is outside a selectable tolerance.

In this example, the direction R which is selectable but fixedly oriented with respect to the image reproduction unit 1 is the corresponding horizontal direction when the active image area of the image reproduction unit 1 is viewed in landscape mode as is indicated in FIG. 1. In general, direction R in a rectangular display screen is that direction extending parallel to the longer side of the display screen. This convention also applies to all of the other configurations and further drawings FIGS. 2 to 5.

Relative luminance distribution curve (measured) along direction R refers in particular to the shape of the luminance distribution curve when its maximum value is normalized to unity. This is shown in FIG. 1 by the exemplary relative luminance distribution curve which is oriented horizontally for the viewer and which results when measuring the image reproduction unit 1 parallel to direction R and which has a narrow shape in the first state illustrated here. However, if the image reproduction unit 1 were measured perpendicular to direction R, this would result in the first state in the vertically oriented exemplary relative luminance distribution curve which has a wide shape as is shown in FIG. 1.

As soon as the shape changes in such a normalized luminance distribution curve, this means that the viewing angle dependency of the luminance measured along direction R or in another direction is modified at the corresponding place in the active image area of the image reproduction unit 1.

The image reproduction unit 1 preferably changes, for the entirety of its image surface, the relative luminance distribution curve for contents displayed thereon at least along direction R, which is selectable but fixedly oriented with respect to the image reproduction unit 1, if a translation path detected by the aforementioned detection means relative to the initial position is above a selectable threshold value and/or a detected angle of rotation relative to the initial orientation is above a respective selectable threshold value and/or the absolute position or relative position with respect to a reference system is outside a selectable tolerance.

A translation path detected by the aforementioned detection means relative to the initial position of the image reproduction unit 1 is above a selectable threshold value, for example, when the corresponding threshold value selected is 2 cm and the detected translation path of the image reproduction unit 1 is approximately 5 cm.

An angle of rotation detected by the aforementioned detection means relative to the initial orientation of the image reproduction unit 1 is above a selectable threshold value, for example, when the threshold value selected is 46° and that of the detected angle of rotation of the image reproduction unit 1 is approximately 80° to 90°.

Only one of the aforementioned threshold values need be considered for the operation of the invention, either that of the translation path or that of the angle of rotation. However, it is also possible to logically AND the two threshold values in order to initiate the change in the relative luminance distribution curve.

Further, the change in the relative luminance distribution curve can be initiated, as described above, in that the absolute position or relative position of the image reproduction unit 1 relative to the aforementioned (selectable) reference system does not lie within the selectable tolerance.

On the other hand, it is also possible to select an absolute position of the image reproduction unit 1 relative to the aforementioned (selectable) reference system. For example, the reference system could be a particular office or a house or a GPS position in general. As tolerance for the position, information about whether or not the image reproduction unit is located inside of this house or office or whether or not the image reproduction unit has exited the GPS position, also in consideration of a (selectable) tolerance, would then be particularly important. Should this tolerance be exceeded, for example, if the image reproduction unit is located outside of the house or office based, for example, on a GPS signal or cell phone tracking signal, the relative luminance distribution curve changes. If the image reproduction unit 1 is moved back into the house or office again, the relative luminance distribution curve changes again, but now preferably back to the original state. A configuration variant of this kind allows, for instance, confidential data outside of a locality determined by means of the selectable tolerance to always be indicated by a narrow relative luminance distribution curve (that is, in a private view mode with a viewing angle range limited corresponding to the relative luminance distribution curve), while a wide relative luminance distribution curve which allows viewing from different viewing angles is also possible within the locality (that is, in a public mode with a larger viewing angle range than in the private view mode in accordance with the wide relative luminance distribution curve).

Figure 2:
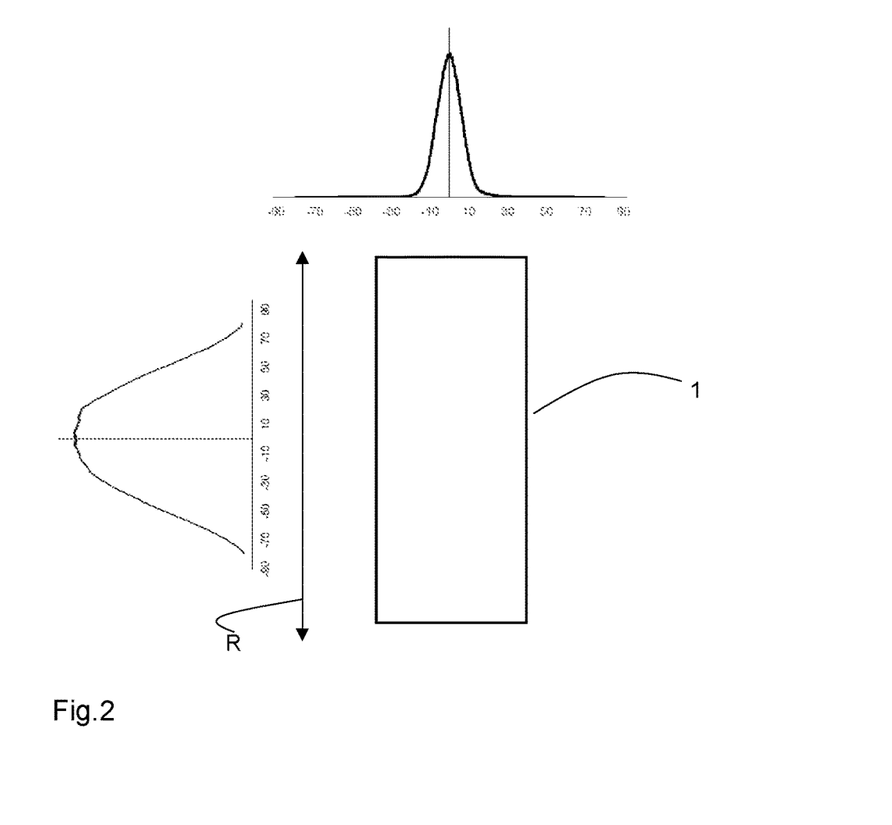
FIG. 2 the schematic diagram of an image reproduction unit in a second state and normalized graphs for relative luminance distribution curves along two directions.

As has been described above, if a change triggered in the relative luminance distribution curve along a direction R (or possibly also along another direction), the image reproduction unit is in a second state, for example. In this regard, FIG. 2 shows the schematic diagram of an image reproduction unit in a second state and normalized graphs for relative luminance distribution curves along two directions.

It will be appreciated here that, while direction R still remains spatially fixed with respect to the image reproduction unit 1, the image reproduction unit 1 has been rotated by 90°. This rotation was detected and has the result that the relative luminance distribution curve along direction R has changed. This luminance distribution curve is henceforth wide, while the shape is narrow at an angle of 90° relative to it.

Accordingly, in this first configuration of the display screen, the relative luminance distribution curve is narrow along a first direction R and wide along a second direction perpendicular to the first direction R. After the aforementioned detection with a detected translation path and/or a detected angle of rotation above the respective selectable threshold value and/or an absolute position or relative position with respect to the reference system within the selectable tolerance, the relative luminance distribution curve is wide along the first direction R and narrow in the second direction, or vice versa. By "vice versa" is meant here that initially the relative luminance distribution curve is wide along a first direction R and narrow along the second direction and, after the aforementioned detection, the relative luminance distribution curve is narrow along a first direction R and wide along the second direction.

In this case and also in all of the further exemplary configurations, the preferred mode is when the first direction R is selected parallel to a long side of the image reproduction unit 1. The second direction is then selected parallel to a short side of the image reproduction unit 1 so that the two directions are perpendicular to one another.

Here and in the following remarks, a relative luminance distribution curve is considered narrow when, in angles which deviate by more than +/−45° around a (definable) reference angle, measured along a defined direction, particularly direction R, emission is always less than 4%, preferably less than 2%, of the peak brightness. For example, if the reference angle is 0° and direction R extends horizontal to the image reproduction unit, the condition for a narrow relative luminance distribution curve would be met when at most 1.5% of the peak brightness is emitted in the angular ranges of from −90° to −45° and from +45° to +90°. The peak brightness can be, for example, 0° or also +/−5° or +/−10° or an angle within this range between −10° and +10°.

In contrast, a relative luminance distribution curve is considered wide when, in angles which deviate by (exactly) +45° and −45° around a (definable) reference angle, measured along a defined direction, particularly direction R, more than 4%, preferably more than 6%, of the peak brightness is emitted. For example, if the reference angle is 0° and direction R extends horizontal to the image reproduction unit, the condition for a wide relative luminance distribution curve would be met if more than 6% of the peak brightness were radiated in angles −45° and +45°, respectively. The peak brightness can be 0° in this instance, for example, or also +/−5° or +/−10° or an angle within the ranges defined by the angles mentioned. To avoid misunderstanding, the definition for a wide relative luminance distribution curve does not explicitly require that even more than 4% of the peak brightness is demanded in angles which deviate by more than +/−45° from the reference angle. Nevertheless, more than 4% of the peak brightness can be emitted in angles deviating from the reference angle by more than +/−45°.

This first configuration is especially relevant in practical respects: if the display screen is a mobile device display screen, for example, particularly the display screen of a smart phone or tablet PC, the narrow relative luminance distribution curve along the aforementioned direction R would bring about a protected view that prevented viewing from the side. If the device is rotated by 90° and the threshold value for the rotation, which could be 50°, for example, is exceeded, the protected view existing for the viewer continues to exist after the detected rotation. In other words, prior to the detection of a (first) rotation, there is a protected view (narrow luminance distribution) in horizontal direction R. Subsequent to the detected rotation, there is a protected view (narrow luminance distribution) in the vertical, second direction which extends perpendicular to horizontal direction R which is coupled with the image reproduction unit 1 so as to be fixed to the body. A back rotation and, consequently, a further detection, can rotate the protected view, therefore the narrow relative luminance distribution, back again by 90°, and so on.

The image reproduction unit 1 can be, for example, an LCD panel or OLED panel. Any other type of display screen is also contemplated.

Figure 3:
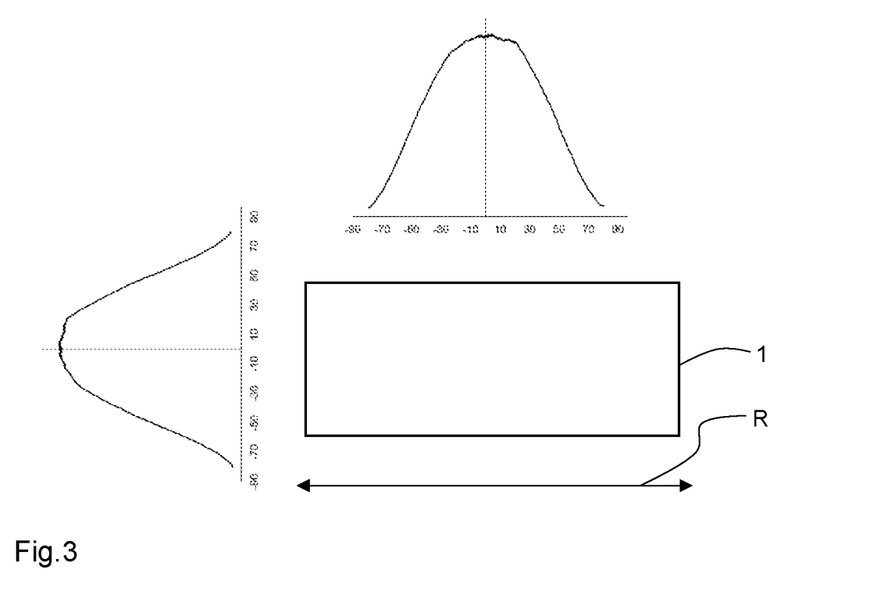
FIG. 3 the schematic diagram of an image reproduction unit in a third state and normalized graphs for relative luminance distribution curves along two directions.

In a second exemplary configuration of the display screen, the relative luminance distribution curve is narrow along a first direction R and wide along a second direction which is perpendicular to the first direction R (as is shown in FIG. 1). After the aforementioned detection with a detected translation path and/or a detected angle of rotation above the respective selectable threshold value and/or an absolute position or relative position with respect to the reference system within the selectable tolerance, the relative luminance distribution curve is wide in both directions (as is shown in FIG. 3), or vice versa. By "vice versa" is meant here that initially the relative luminance distribution curve is wide along a first direction and wide along the second direction (see FIG. 3) and, after the aforementioned detection, the relative luminance distribution curve is narrow along the first direction and wide along the second direction (see FIG. 1).

Figure 4:
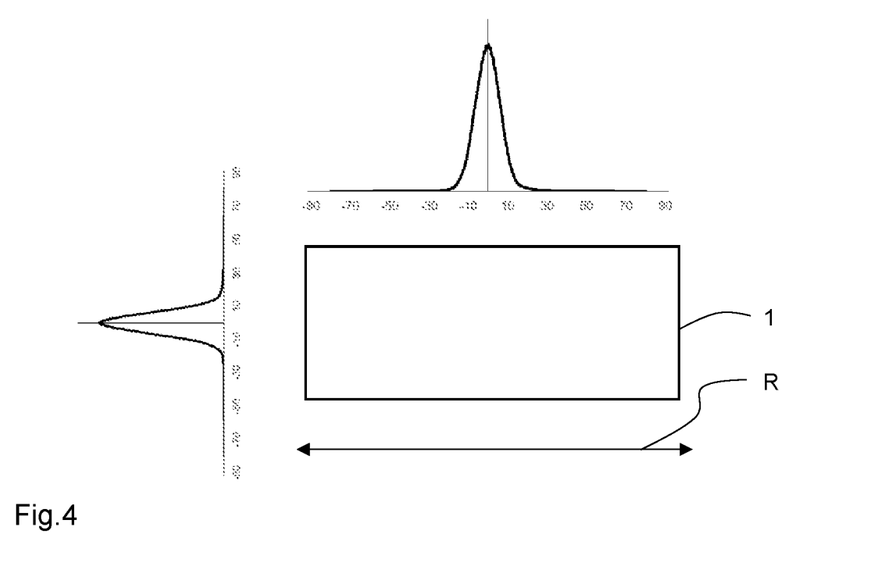
FIG. 4 the schematic diagram of an image reproduction unit in a fourth state and normalized graphs for relative luminance distribution curves along two directions.
Figure 5:
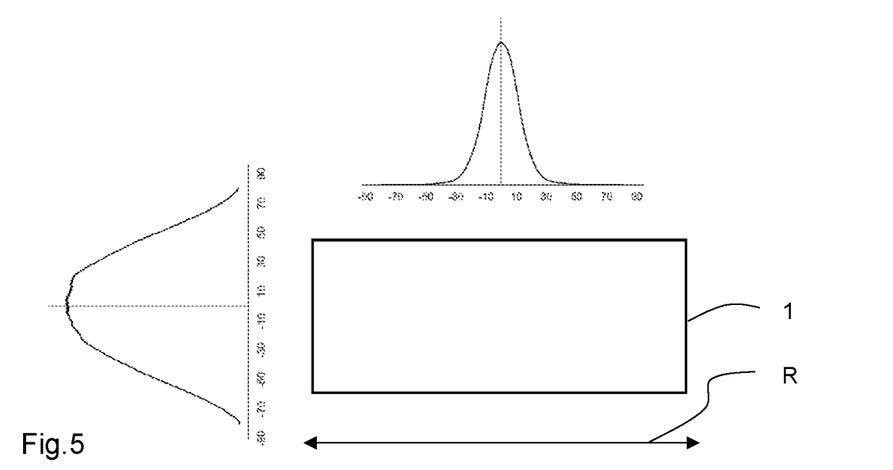
FIG. 5 the schematic diagram of an image reproduction unit in a fifth state and normalized graphs for relative luminance distribution curves along two directions.

In a third exemplary configuration of the display screen, the relative luminance distribution curve is narrow along a first direction R and along a second direction perpendicular to the first direction R (see FIG. 4). After the aforementioned detection with a detected translation path and/or a detected angle of rotation above the respective selectable threshold value and/or an absolute position or relative position with respect to the reference system within the selectable tolerance, the relative luminance distribution curve is wide along the first direction R and along the second direction, respectively (see FIG. 3), or vice versa. By "vice versa" is meant here that initially the relative luminance distribution curve is wide along the first direction and along the second direction (see FIG. 3) and, after the aforementioned detection, the relative luminance distribution curve is narrow along the first direction and along the second direction (see FIG. 4).

In a fourth exemplary configuration of the display screen, the relative luminance distribution curve is wide along a first direction R and narrow along a second direction perpendicular to the first direction R (see FIG. 2) and, after the aforementioned detection with a detected translation path and/or a detected angle of rotation above the respective selectable threshold value and/or an absolute position or relative position with respect to the reference system within the selectable tolerance, the relative luminance distribution curve is narrow along the first direction R and along the second direction (see FIG. 4), or vice versa. By "vice versa" is meant here that initially the relative luminance distribution curve is narrow along the first direction and along the second direction (see FIG. 4) and, after the aforementioned detection, the relative luminance distribution curve is wide along the first direction and narrow along the second direction (see FIG. 2).

Finally, in a fifth exemplary configuration of the display screen, the relative luminance distribution curve is narrow along at least one direction (see FIG. 5), and, after the aforementioned detection with a detected translation path and/or a detected angle of rotation above the respective selectable threshold value and/or an absolute position or relative position with respect to the reference system within the selectable tolerance, the relative luminance distribution curve is narrower along the at least one direction than it was prior to the aforementioned detection (see the FIG. 1), or vice versa. In this case, "vice versa" means that initially the relative luminance distribution curve is very narrow (see FIG. 1) along at least one direction and, after the aforementioned detection, the relative luminance distribution curve along the at least one direction is still narrow but is nevertheless wider than prior to the detection (see FIG. 5). The full width at half maximum (FWHM), for example, can serve here as criterion for distinguishing between "narrow" and "very narrow". A narrow relative luminance distribution has a greater FWHM than a very narrow relative luminance distribution. However, both relative luminance distributions must of course fulfill the definition introduced above for a narrow relative luminance distribution.

This configuration is helpful, for example, when the viewing distance of a viewer changes in a private view mode of the display screen along the at least one direction, e.g., the horizontal direction. When the viewing distance from the display screen is shorter, the relative luminance distribution curve should be wider than when the distance is greater so as to allow the best possible image perception. Conversely, at a greater viewing distance from the display screen, the relative luminance distribution curve should be narrower than at a shorter distance.

The aforementioned means for detecting a translation and/or a rotation of the image reproduction unit 1 (and therefore inherently also of the display screen) comprise, for example, at least one of the following components: gravitational sensor, magnetometer, accelerometer, GPS sensor, tachometer, radio sensor, laser, rotational sensor, force sensor, pressure sensor, radar, satellite positioning, WLAN, cell tracking, ultrasound unit, eye tracking, camera, 3D camera, infrared camera, time-of-flight camera, or LIDAR. However, other configurations are also possible.

A display screen according to the invention in which the image reproduction unit 1 is realized by means of a transmissive imager, such as an LCD panel, can have, for example, a backlight which can emit light with at least two different selectable relative luminance distribution curves, and the at least two relative luminance distribution curves are measured along direction R which is selectable but fixedly oriented with respect to the image reproduction unit 1.

A backlight of this kind can be configured, for example, as a dual backlight unit, i.e., it has two light guides with different emission characteristics and, therefore, also with different relative luminance distribution curves measured along the aforementioned direction R. Depending on the desired relative luminance distribution curve, light is then radiated into the one light guide and/or other light guide for coupling out two-dimensionally. The front light guide considered in viewing direction must be at least partially transparent.

A display screen such as that described above is advantageously used in a mobile device. However, it may also be used in a motor vehicle, aircraft or watercraft, in a pay terminal or in an entry system.

The above-stated object of the invention has been met: a display screen has been described which adapts its light-emitting characteristic, particularly preferably its protective view characteristics, during movement such as rotation and/or translation. This is possible using simple means which can be integrated in the display screen and which do not require any action on the part of the user such as pressing a toggle button or rotating a mechanical privacy filter.

The invention claimed is:

1. A display screen comprising an image reproduction unit with a control unit and detector configured to detect a translation of the image reproduction unit relative to an initial position and/or a rotation of the image reproduction unit relative to an initial orientation and/or to detect an absolute position or relative position of the image reproduction unit with respect to a reference system, wherein the image reproduction unit changes, at least for a portion of its image surface, a relative luminance distribution curve for contents displayed thereon at least along a direction (R), which is selectable but fixedly oriented with respect to the image reproduction unit, when a translation path detected by the detector relative to the initial position is above a selectable threshold value and/or a detected angle of rotation relative to the initial orientation is above a respective selectable threshold value and/or an absolute position or relative position with respect to a reference system is outside a selectable tolerance;

wherein the relative luminance distribution curve is narrow along a first direction (R) and is wide along a second direction differing from the first direction (R), and wherein, after the aforementioned detection with a detected translation path and/or a detected angle of rotation above the respective selectable threshold value and/or an absolute position or relative position with respect to the reference system within the selectable tolerance, the relative luminance distribution curve is wide along the first direction (R) and is narrow along the second direction, or vice versa; and wherein the display screen further comprises a switchable light filter located in front in a viewing direction of a viewer or in the image reproduction unit, which switchable light filter in turn comprises:

a first optical element which:

comprises a first layer, or a first layer and a plurality of further layers, wherein each layer comprises a material with a plurality of light-absorbing transition dipole moments, wherein every transition dipole moment is oriented, at least in a first state with a tolerance of a maximum of 10°, parallel to a first reference direction which is selectable for the first optical element or fluctuates around this first reference direction, such that light which is incident in the first optical element is transmitted or at least partially absorbed depending on its incident direction relative to the layers and its polarization state, a polarization filter which is arranged upstream or downstream of the first optical element considered in incident direction, a generator configured to selectively generate a first electric field or a second electric field, a liquid crystal layer arranged between the first optical element and the polarization filter, this liquid crystal layer being acted upon by the first electric field or the second electric field and, depending thereon, influences the polarization state of light passing through it so that, in a first operating mode B1 in which the first electric field is applied, with a first sub-operating mode B1H and a second sub-operating mode B1V, on the one hand, at least 24% of unpolarized light which is incident in the switchable light filter parallel to the first reference direction is transmitted and, on the other hand, at least 85% of unpolarized light which is incident in the switchable light filter in an angle of greater than 30° to the first reference direction is absorbed, wherein this absorption takes place exclusively along a first reference direction in the first sub-operating mode B1H and exclusively in a second direction perpendicular to the first reference direction in the second sub-operating mode B1V, in a second operating mode B2 in which the second electric field is applied, with the first sub-operating mode B1H and the second sub-operating mode B1V, on the one hand, at least 24% of unpolarized light which is incident in the switchable light filter parallel to the first reference direction is transmitted and, on the other hand, at least 85% of unpolarized light which is incident in the switchable light filter in an angle of greater than 30° with respect to the first reference direction is absorbed, wherein this absorption takes place exclusively in the second reference direction in the first sub-operating mode B1H and exclusively in the second reference direction perpendicular to the first reference direction in the second sub-operating mode B1V, so that the reference directions of absorption differ by 90°, respectively, for each of the two sub-operating modes B1H, B1V for the first operating mode B1 and the second operating mode B2.

2. The display screen according to claim 1, wherein the relative luminance distribution curve is narrow along at least one direction, and wherein, after the aforementioned detection with a detected translation path and/or a detected angle of rotation above the respective selectable threshold value and/or an absolute position or relative position with respect to a reference system within the selectable tolerance, the relative luminance distribution curve is narrower along the at least one direction than it was prior to the aforementioned detection.

3. The display screen according to claim 2, further comprising a backlight which can emit light with at least two different selectable relative luminance distribution curves, wherein the at least two relative luminance distribution curves are measured along a direction (R) which is selectable but fixedly oriented with respect to the image reproduction unit.

4. The display screen according to claim 2, further comprising a switchable optical component which can selectively influence the relative luminance distribution curve measured along a direction (R) which is selectable but fixedly oriented with respect to the image reproduction unit, wherein this switchable optical component comprises at least one of the following components: liquid crystals, electrochromic layers, photochromic layers, thermochromic layers, electrophoretic or magnetophoretic particles and/or electrowetting droplets.

5. The display screen according to claim 1, wherein after the aforementioned detection with a detected translation path and/or a detected angle of rotation above the respective selectable threshold value and/or an absolute position or relative position with respect to a reference system within the selectable tolerance, the display of the image contents displayed on the image reproduction unit is changed.

6. The display screen according to claim 5, wherein, the display of the image contents displayed on the image reproduction unit are rotated.

7. The display screen according to claim 1, wherein the detector configured to detect a translation and/or a rotation of the image reproduction unit comprises at least one of the following components: gravitational sensor, magnetometer, accelerometer, GPS sensor, tachometer, radio sensor, laser, rotational sensor, force sensor, pressure sensor, radar, satellite positioning, WLAN, cell tracking, ultrasound unit, eye tracking, camera, 3D camera, infrared camera, time-of-flight camera, or LIDAR.

8. The display screen according to claim 1, wherein the respective light filter is divided into a plurality of separately switchable segments so as to allow local switchability between the respective possible operating states.

9. The display screen according to claim 1 further comprising a backlight which can emit light with at least two different selectable relative luminance distribution curves, wherein the at least two relative luminance distribution curves are measured along a direction (R) which is selectable but fixedly oriented with respect to the image reproduction unit.

10. The display screen according to claim 1, further comprising a switchable optical component which can selectively influence the relative luminance distribution curve measured along a direction (R) which is selectable but fixedly oriented with respect to the image reproduction unit, wherein this switchable optical component comprises at least one of the following components: liquid crystals, electrochromic layers, photochromic layers, thermochromic layers, electrophoretic or magnetophoretic particles and/or electrowetting droplets.

11. The display screen according to claim 1, wherein the respective light filter is divided into a plurality of separately switchable segments so as to allow local switchability between the respective possible operating states.

12. A display screen comprising an image reproduction unit with a control unit and detector configured to detect a translation of the image reproduction unit relative to an initial position and/or a rotation of the image reproduction unit relative to an initial orientation and/or to detect an absolute position or relative position of the image reproduction unit with respect to a reference system, wherein the image reproduction unit changes, at least for a portion of its image surface, a relative luminance distribution curve for contents displayed thereon at least along a direction (R), which is selectable but fixedly oriented with respect to the image reproduction unit, when a translation path detected by the detector relative to the initial position is above a selectable threshold value and/or a detected angle of rotation relative to the initial orientation is above a respective selectable threshold value and/or an absolute position or relative position with respect to a reference system is outside a selectable tolerance;

wherein the relative luminance distribution curve is narrow along a first direction (R) and wide along a second direction differing from the first direction (R), and wherein, after the aforementioned detection with a detected translation path and/or a detected angle of rotation above the respective selectable threshold value and/or an absolute position or relative position with respect to the reference system within the selectable tolerance, the relative luminance distribution curve is wide along both directions;

and the display screen further comprising a switchable light filter located in front in a viewing direction of a viewer or in the image reproduction unit, which switchable light filter in turn comprises:

a first optical element which:

comprises a first layer, or a first layer and a plurality of further layers, wherein each layer comprises a material with a plurality of light-absorbing transition dipole moments, wherein every transition dipole moment is oriented, at least in a first state with a tolerance of a maximum of 10°, parallel to a first reference direction which is selectable for the first optical element or fluctuates around this first reference direction, such that light which is incident in the first optical element is transmitted or at least partially absorbed depending on its incident direction relative to the layers and its polarization state, wherein the transition dipole moments in each of the layers can be varied with respect to orientation and/or amount between the first state and at least one second state in order, alternately, to bring the respective layer into at least two different states, a polarization filter which is arranged upstream or downstream of the first optical element, a generator configured to selectively generate a first electric field or a second electric field, wherein, for the first optical element, the first state is generated by applying the first electric field and the second state is generated by applying the second electric field so that, in a first operating mode B1 in which the first electric field is applied and the transition dipole moments of the layers of the first optical element are oriented along the first reference direction, with a first sub-operating mode B1H and a second sub-operating mode B1V, on the one hand, at least 24% of unpolarized light which is incident in the switchable light filter parallel to the first reference direction is transmitted and, on the other hand, at least 85% of unpolarized light which is incident in the switchable light filter in an angle of greater than 30° with respect to the first reference direction is absorbed, wherein this absorption takes place exclusively along a first reference direction in the first sub-operating mode B1H and exclusively in a second reference direction perpendicular to the first reference direction in the second sub-operating mode B1V, and in a second operating mode B3 in which the second electric field is applied and the transition dipole moments of the layers of the first optical element are oriented parallel to a surface of the polarization filter and perpendicular to a transmission direction of the polarization filter, at least 24% of unpolarized light which is incident in the switchable light filter at any angle with respect to the first reference direction is transmitted.

13. A display screen comprising an image reproduction unit with a control unit and detector configured to detect a translation of the image reproduction unit relative to an initial position and/or a rotation of the image reproduction unit relative to an initial orientation and/or to detect an absolute position or relative position of the image reproduction unit with respect to a reference system, wherein the image reproduction unit changes, at least for a portion of its image surface, a relative luminance distribution curve for contents displayed thereon at least along a direction (R), which is selectable but fixedly oriented with respect to the image reproduction unit, when a translation path detected by the detector relative to the initial position is above a selectable threshold value and/or a detected angle of rotation relative to the initial orientation is above a respective selectable threshold value and/or an absolute position or relative position with respect to a reference system is outside a selectable tolerance;

wherein the relative luminance distribution curve is narrow along a first direction (R) and along a second direction differing from the first direction (R), and wherein, after the aforementioned detection with a detected translation path and/or a detected angle of rotation above the respective selectable threshold value and/or an absolute position or relative position with respect to a reference system within the selectable tolerance, the relative luminance distribution curve is wide along the first direction (R) and along the second direction; and the display screen further comprising a switchable light filter located in front in a viewing direction of a viewer or in the image reproduction unit, which switchable light filter in turn comprises:

a first optical element and a second optical element, wherein each of the two optical elements comprises a first layer, or a first layer and a plurality of further layers, wherein each layer comprises a material with a plurality of light-absorbing transition dipole moments, wherein every transition dipole moment is oriented, at least in a first state with a tolerance of a maximum of 10°, parallel to a first reference direction which is selectable for the first optical element and second reference direction which is selectable for the second optical element or fluctuates around the latter, such that light which is incident in the first optical element or second optical element is transmitted or at least partially absorbed depending on its incident direction relative to the layers and its polarization state, wherein the first reference direction and the second reference direction of the transition dipole moments differ from one another by less than 40°, a liquid crystal layer which is arranged between the first optical element and the second optical element and which, depending on a first electric field or second electric field acting upon the liquid crystal layer, influences the polarization state of light penetrating through it, generator configured to selectively generate the first electric field or the second electric field, optionally, a polarization filter which is arranged above or below a unit comprising one of the two optical elements, or no polarization filter, so that either, if the polarization filter is present, in a first operating mode B1 in which the first electric field is applied, with a first sub-operating mode B1H and a second sub-operating mode B1V, on the one hand, at least 24% of unpolarized light which is incident in the switchable light filter parallel to the first reference direction or second reference direction is transmitted and, on the other hand, at least 85% of unpolarized light which is incident in the switchable light filter in an angle of greater than 30° with respect to the corresponding reference direction is absorbed, wherein this absorption takes place exclusively along a first reference direction in the first sub-operating mode B1H and exclusively in a second reference direction perpendicular to the first reference direction in the second sub-operating mode B1V, wherein either the first reference direction or the second reference direction is perpendicular to a polarization direction of the polarization filter, or, if no polarization filter is present, in a first operating mode B1 in which the first electric field is applied, at least 24% of unpolarized light which is incident in the switchable light filter at any angle is transmitted, and, regardless of the presence of a polarization filter, in a second operating mode B2 in which the second electric field is applied, on the one hand, at least 24% of unpolarized light which is incident in the switchable light filter parallel to the first reference direction or to the second reference direction is transmitted and, on the other hand, at least 85% of unpolarized light which is incident in the switchable light filter in an angle of greater than 30° with respect to the corresponding reference direction is absorbed.

14. A display screen comprising an image reproduction unit with a control unit and detector configured to detect a translation of the image reproduction unit relative to an initial position and/or a rotation of the image reproduction unit relative to an initial orientation and/or to detect an absolute position or relative position of the image reproduction unit with respect to a reference system, wherein the image reproduction unit changes, at least for a portion of its image surface, a relative luminance distribution curve for contents displayed thereon at least along a direction (R), which is selectable but fixedly oriented with respect to the image reproduction unit, when a translation path detected by the detector relative to the initial position is above a selectable threshold value and/or a detected angle of rotation relative to the initial orientation is above a respective selectable threshold value and/or an absolute position or relative position with respect to a reference system is outside a selectable tolerance;

wherein the relative luminance distribution curve is narrow along a first direction (R) and along a second direction differing from the first direction (R), and wherein, after the aforementioned detection with a detected translation path and/or a detected angle of rotation above the respective selectable threshold value and/or an absolute position or relative position with respect to a reference system within the selectable tolerance, the relative luminance distribution curve is wide along the first direction (R) and along the second direction; and the display screen further comprising a switchable light filter located in front in a viewing direction of a viewer or in the image reproduction unit, which switchable light filter in turn comprises:

a first optical element and a second optical element, wherein each of the two optical elements comprises a first layer, or a first layer and a plurality of further layers, wherein each layer comprises a material with a plurality of light-absorbing transition dipole moments, wherein every transition dipole moment is oriented, at least in a first state with a tolerance of a maximum of 10°, parallel to a first reference direction which is selectable for the first optical element and second reference direction which is selectable for the second optical element or fluctuates around the latter, such that light which is incident in the first optical element or second optical element is transmitted or at least partially absorbed depending on its incident direction relative to the layers and its polarization state, wherein the transition dipole moments in each of the layers can be varied with respect to orientation and/or amount between the first state and at least one second state in order, alternately, to bring the respective layer into at least two different states, generator configured to selectively generate a first electric field or a second electric field, wherein, for each of the two optical elements, the first state is generated by applying the first electric field and the second state is generated by applying the second electric field, an optically anisotropic layer arranged between the two optical elements for rotating a polarization direction of light which penetrates the optically anisotropic layer by 90°, optionally, a polarization filter arranged above or below a unit comprising one of the two optical elements, or no polarization filter, so that in a first operating mode B1 in which the first electric field is applied, at least 24% of unpolarized light which is incident in the switchable light filter at any angle relative to the switchable light filter is transmitted, wherein in the first operating mode B1, the transition dipole moments of the two optical elements are oriented perpendicular to one another and, in case no polarization filter is present, polarization filter transition dipole elements of the polarization filter are oriented parallel to the transition dipole moments of the switchable optical element closest to the polarization filter, and in a second operating mode B2 in which the second electric field is applied, on the one hand, at least 24% of unpolarized light which is incident in the switchable light filter parallel to the first reference direction or to the second reference direction is transmitted and, on the other hand, at least 85% of unpolarized light which is incident in the switchable light filter in an angle of greater than 30° to the corresponding reference direction is absorbed, wherein in operating mode B2 the transition dipole moments of the polarization filter, if any, and the transition dipole moments of the switchable optical element closest to the polarization filter are oriented perpendicular to one another, and the transition dipole moments of the two optical elements are oriented parallel to one another.

15. A display screen comprising an image reproduction unit with a control unit and detector configured to detect a translation of the image reproduction unit relative to an initial position and/or a rotation of the image reproduction unit relative to an initial orientation and/or to detect an absolute position or relative position of the image reproduction unit with respect to a reference system, wherein the image reproduction unit changes, at least for a portion of its image surface, a relative luminance distribution curve for contents displayed thereon at least along a direction (R), which is selectable but fixedly oriented with respect to the image reproduction unit, when a translation path detected by the detector relative to the initial position is above a selectable threshold value and/or a detected angle of rotation relative to the initial orientation is above a respective selectable threshold value and/or an absolute position or relative position with respect to a reference system is outside a selectable tolerance;

wherein the relative luminance distribution curve is wide along a first direction (R) and narrow along a second direction differing from the first direction (R), and wherein, after the aforementioned detection with a detected translation path and/or a detected angle of rotation above the respective selectable threshold value and/or an absolute position or relative position with respect to a reference system within the selectable tolerance, the relative luminance distribution curve is narrow along the first direction (R) and along the second direction; and the display screen further comprising a switchable light filter located in front in a viewing direction of a viewer or in the image reproduction unit, which switchable light filter in turn comprises:

a first optical element and a second optical element, wherein each of the two optical elements comprises a first layer, or a first layer and a plurality of further layers, wherein each layer comprises a material with a plurality of light-absorbing transition dipole moments, wherein every transition dipole moment is oriented, at least in a first state with a tolerance of a maximum of 10°, parallel to a first reference direction which is selectable for the first optical element and second reference direction which is selectable for the second optical element or fluctuates around the latter, such that light which is incident in the first optical element or second optical element is transmitted or at least partially absorbed depending on its incident direction relative to the layers and its polarization state, wherein the first reference direction and the second reference direction of the transition dipole moments differ from one another by less than 40°, a liquid crystal layer which is arranged between the first optical element and the second optical element and which, depending on a first electric field or second electric field acting upon the liquid crystal layer, influences the polarization state of light penetrating through it, a generator configured to selectively generate the first electric field or the second electric field, optionally, a polarization filter which is arranged above or below a unit comprising one of the two optical elements, or no polarization filter, so that either, if the polarization filter is present, in a first operating mode B1 in which the first electric field is applied, with a first sub-operating mode B1H and a second sub-operating mode B1V, on the one hand, at least 24% of unpolarized light which is incident in the switchable light filter parallel to the first reference direction or second reference direction is transmitted and, on the other hand, at least 85% of unpolarized light which is incident in the switchable light filter in an angle of greater than 30° with respect to the corresponding reference direction is absorbed, wherein this absorption takes place exclusively along a first reference direction in the first sub-operating mode B1H and exclusively in a second reference direction perpendicular to the first reference direction in the second sub-operating mode B1V, wherein either the first reference direction or the second reference direction is perpendicular to a polarization direction of the polarization filter, or, if no polarization filter is present, in a first operating mode B1 in which the first electric field is applied, at least 24% of unpolarized light which is incident in the switchable light filter at any angle is transmitted, and, regardless of the presence of a polarization filter, in a second operating mode B2 in which the second electric field is applied, on the one hand, at least 24% of unpolarized light which is incident in the switchable light filter parallel to the first reference direction or to the second reference direction is transmitted and, on the other hand, at least 85% of unpolarized light which is incident in the switchable light filter in an angle of greater than 30° with respect to the corresponding reference direction is absorbed.

* * * * *